(12) United States Patent
Calagaz

(10) Patent No.: US 11,490,019 B2
(45) Date of Patent: Nov. 1, 2022

(54) SYSTEM AND METHOD FOR DISPLAYING ELEVATED, POLARIZED VIEWS OF WATER BODIES

(71) Applicant: Fishing Chaos, LLC, Mobile, AL (US)

(72) Inventor: John Calagaz, Mobile, AL (US)

(73) Assignee: Fishing Chaos, LLC, Mobile, AL (US)

( * ) Notice: Subject to any disclaimer, the term of this patent is extended or adjusted under 35 U.S.C. 154(b) by 100 days.

(21) Appl. No.: 17/001,066

(22) Filed: Aug. 24, 2020

(65) Prior Publication Data

US 2021/0058558 A1 Feb. 25, 2021

Related U.S. Application Data

(60) Provisional application No. 62/890,721, filed on Aug. 23, 2019.

(51) Int. Cl.
| | |
|---|---|
| *H04N 7/18* | (2006.01) |
| *H04N 5/232* | (2006.01) |
| *H04N 5/225* | (2006.01) |
| *G03B 11/00* | (2021.01) |
| *G06T 7/20* | (2017.01) |
| *G03B 17/56* | (2021.01) |
| *H04N 5/445* | (2011.01) |
| *G06V 40/10* | (2022.01) |

(52) U.S. Cl.
CPC .......... *H04N 5/23299* (2018.08); *G03B 11/00* (2013.01); *G03B 17/561* (2013.01); *G06T 7/20* (2013.01); *G06V 40/10* (2022.01); *H04N 5/2253* (2013.01); *H04N 5/445* (2013.01)

(58) Field of Classification Search
CPC ...... H04N 5/23299; H04N 5/445; H04N 5/33; H04N 5/2256; H04N 7/183; H04N 5/2252; H04N 5/23245; H04N 5/2251; H04N 5/2354; H04N 5/332; H04N 5/77; H04N 13/271; G06K 9/00362; G06T 7/20
USPC .......................................................... 348/143
See application file for complete search history.

(56) References Cited

U.S. PATENT DOCUMENTS

| | | | | |
|---|---|---|---|---|
| 2007/0296816 | A1* | 12/2007 | Rubio | H04N 7/181 348/E7.086 |
| 2014/0110541 | A1* | 4/2014 | Hoe | F16M 11/26 403/104 |
| 2015/0365581 | A1* | 12/2015 | Pryszo | H04N 7/183 348/211.8 |
| 2018/0106418 | A1* | 4/2018 | Anglin | F16M 11/28 |

* cited by examiner

*Primary Examiner* — Masum Billah
(74) *Attorney, Agent, or Firm* — AdamsIP, LLC; Edward B Garner, III; James H Adams

(57) ABSTRACT

A system and method for displaying elevated, polarized views of water bodies are provided. The system and method of the present disclosure are generally designed to obtain images from a vantage point located at a first location and subsequently transmit and display the same to an individual located at a second location. To this end, the system and method of the present disclosure may comprise a camera, a mounting device, and a display operably connected to the camera. The mounting device may be used to attach the camera in an elevated position on a boat to enable the camera to capture video images of the body of water surrounding the boat. To reduce glare on the body of water, the camera may have a polarized filter. Video images captured by the camera are transmitted to the display for display thereon in real time.

28 Claims, 5 Drawing Sheets

SYSTEM AND METHOD FOR DISPLAYING ELEVATED, POLARIZED VIEWS OF WATER BODIES

CROSS REFERENCES

This application claims priority to U.S. Provisional Application Ser. No. 62/890,721, filed on Aug. 23, 2019, in which both applications are incorporated herein in their entirety by reference.

FIELD OF THE DISCLOSURE

The subject matter of the present disclosure refers generally to a system and method for displaying elevated, polarized views of water bodies.

BACKGROUND

Many recreational fishing boats have fishing towers that provide elevated platforms on which anglers may stand to obtain an elevated view of the waters surrounding the boat. To better see into the water from this elevated position, anglers often wear polarized sunglasses designed to reduce glare caused by the reflection of the sun from a water body. The vantage point and visibility afforded through the use of such fishing towers and polarized sunglasses generally provide an advantage to anglers by allowing them to visually identify fish location within a body of water and to subsequently cast bait into such location. This method of fishing is commonly referred to as sight fishing, and getting an elevated polarized view of surrounding waters is critical to successful sight fishing.

However, there are a number of problems and disadvantages associated with the use of fishing towers on boats to obtain the elevated views necessary for sight fishing. Because fishing towers are commonly elevated eight to ten feet or more above the deck of a boat, utilizing such fishing towers requires anglers to position themselves at a dangerous height above the boat's deck surface. As the boat moves in a bobbing motion in the water due to wave action, an angler's balance may be disrupted. This effect may be uncomfortable and even dangerous for anglers standing on the platform. For instance, rough waters may magnify the aforementioned effect to the point where anglers are ejected or otherwise dislodged from the fishing tower onto the deck of a boat or into the body of water surrounding the boat.

Moreover, the use of fishing towers generally requires anglers to climb up and down a series of steps or rungs to transport to and from the standing platform of the fishing tower. As such, falls sometimes occur, which may cause injury. Additionally, the series of steps or rungs may prevent physically disabled or elderly anglers from utilizing such fishing towers. Furthermore, while an angler is on the fishing tower, they are generally unable to use any instruments located on the boat's center console, such as a depth finder, unless controls are also installed in the fishing tower. This may be dangerous when fishing in more shallow areas since it increases the risk that a fisherman may bottom out and damage the hull of their boat.

In instances where a boat is devoid of such fishing towers, anglers may attempt to make makeshift fishing towers using materials or objects present on the boat, such as coolers, and stand thereon to sight fish. However, the elevation afforded by such makeshift fishing towers and/or structural integrity of the same are generally insufficient to safely and successfully sight fish. In some instances, anglers may alternatively choose to retrofit their boat with a fishing tower. However, depending on the type and design of a boat, retrofit installation may be difficult and costly. Moreover, it is not always advantageous to have a fishing tower on a boat. For instance, anglers fishing with fly rods need more space to work their rods and throw their line than anglers using casting rods, trolling rods, and spinning rods due to the length of the fly rod, the action of the line, and the mechanics of casting the fly rod. Fishing towers occupy a large degree of space on a boat's deck, which effectively limits the space in which an angler can maneuver their rod. In instances where an angler is fly fishing, a large fishing tower may increase the likelihood that the fly angler will tangle their line or break their rod on the fishing platform. Removing and reinstalling a fishing tower depending on the type of fishing an angler will be performing is time consuming and costly. Nor is it cost effective for an angler to have a separate boat anytime that angler wants to fish with fly rods.

Furthermore, boats having fishing towers installed face another problem: storage and travel. Boats without fishing towers can often be stored at a marina in onsite dry storage. Dry storage is often not possible for boats with fishing towers because the dry storage units often have strict height requirements. In addition, most roads have a height restriction of thirteen feet six inches. Boats that do not exceed thirteen feet six inches when on a trailer can be stored out of water at one's home. However, this becomes a more difficult restriction for a fisherman who wants to store their boat at home to comply with when an eight- to ten-foot fishing tower is installed. The height restriction also presents a problem for the traveling fisherman since this restriction makes it more difficult to transport fishing equipment to different parts of the country by way of roads.

Accordingly, there is a need in the art for a system and method that enables anglers to obtain elevated, polarized views from a boat that does not require anglers to occupy a fishing tower.

SUMMARY

A system and method for displaying elevated, polarized views of water bodies are provided. The system and method of the present disclosure are generally designed to obtain images obtained from a vantage point located at a first location and subsequently transmit and display the same to an individual located at a second location. To this end, the system and method of the present disclosure may comprise a display operably connected to a camera. The system may utilize a 360-degree camera that transmits a video feed to the display in real time.

To provide elevated views of a water body surrounding a boat, the camera may be mounted to the boat in an elevated position. The camera may be mounted on an existing fishing tower on a boat so that an angler does not have to climb the fishing tower in order to get an elevated view of surrounding waters. Alternatively, the camera may be mounted to the body of a boat or a component attached thereto, such as a rod holder, via a mounting device. The mounting device may comprise an adjustable arm having a first end with a camera mount secured thereto that secures to the camera. Preferably, the camera mount is a gimbal designed to keep the camera steady when the camera is mounted to the boat and the boat is moving.

In some instances, the adjustable arm may be sized to fit into a standard rod holder. To adjust the elevation at which the camera is disposed, the adjustable arm may be extendable and/or have a plurality joints therein that allow users to reposition the camera at different angles. In some embodiments, the mounting device further comprise a base plate secured to a second end of the adjustable arm opposite the camera. In such embodiments, the base plate may be secured to a surface of a boat to secure the camera in an elevated position above the boat's deck. The camera preferably has a light filter, which is constructed to filter out polarized light. The camera is capable of switching back and forth between polarized and non-polarized views.

The display provides a screen on which the user may view the video feed of the camera in real time. The display may be mounted to the boat in a non-elevated position that enables an angler to view elevated views provided by the camera's video feed without requiring the angler to climb a fishing tower. In some instances, the display may be located near other boat controls, such as various gauges or a depth finder. Preferably, the display has controls for controlling the camera. For instance, the display may have a user interface that allows a user to rotate the camera horizontally and/or vertically, to optionally adjust the height of the camera when mounted on the adjustable arm, to switch between polarized and non-polarized views, or to control various other functions of the camera. To process the video feed generated by the camera prior to display on the display and to carry out various other functions disclosed herein, the system may further comprise a processor operably connected to the camera and the display.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
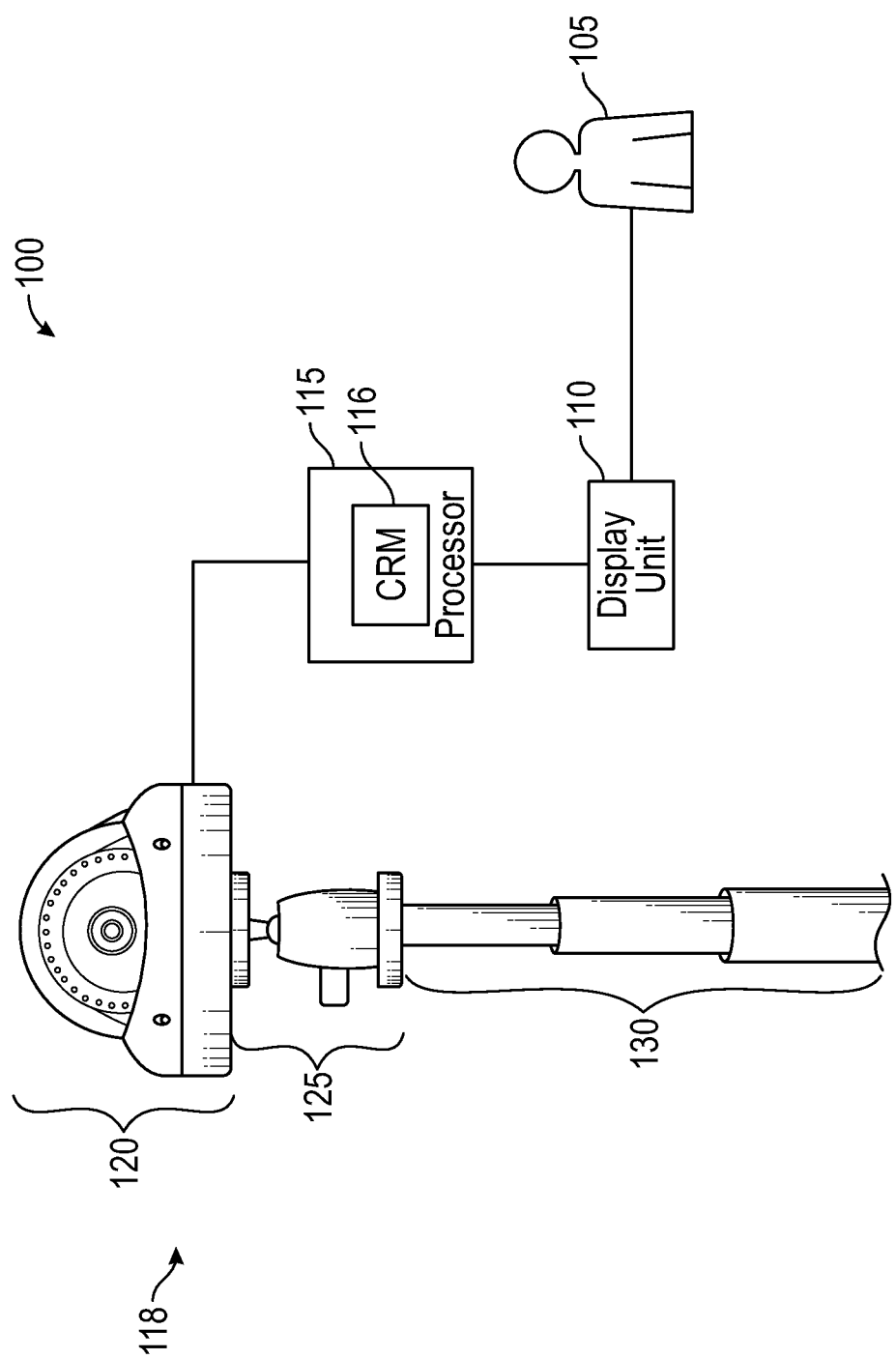
FIG. 1 shows a system embodying features consistent with the principles of the present disclosure.
Figure 2:
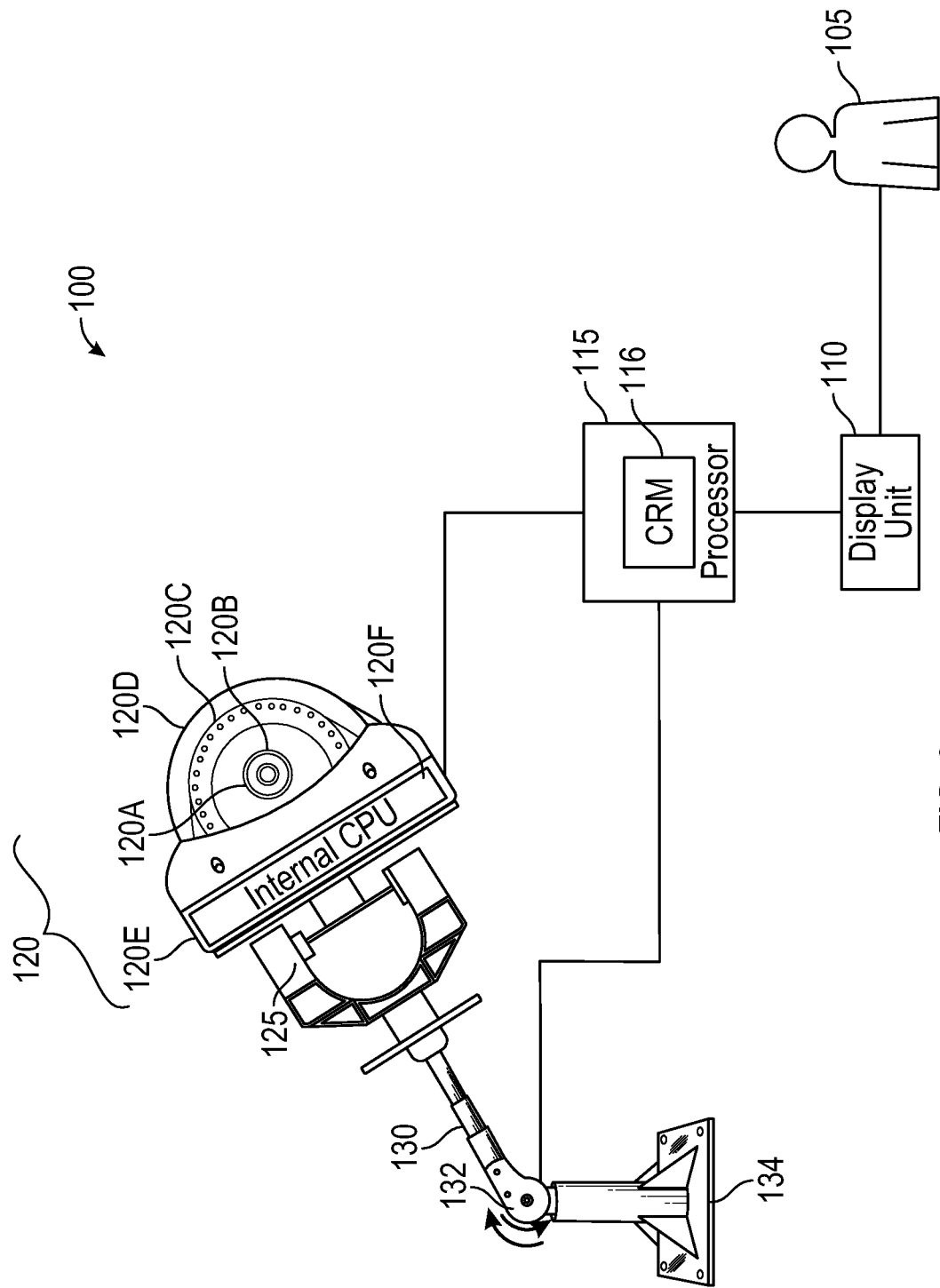
FIG. 2 shows a system embodying features consistent with the principles of the present disclosure.
Figure 3:
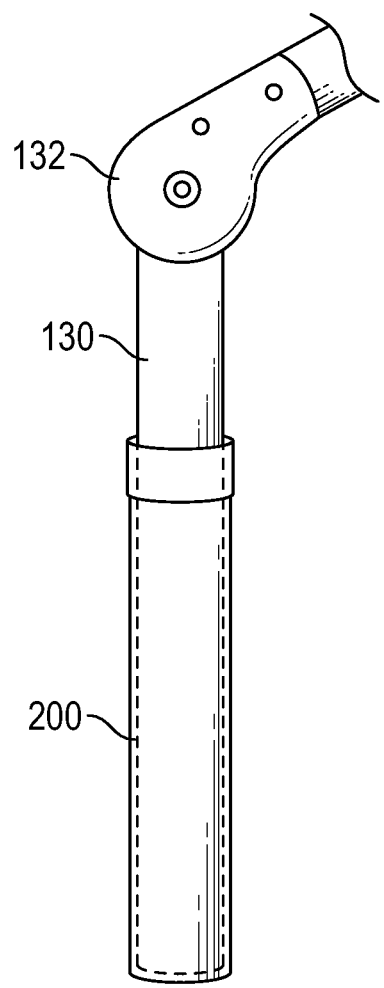
FIG. 3 shows an adjustable arm embodying features consistent with the principles of the present disclosure disposed within a fishing rod holder.
Figure 4:
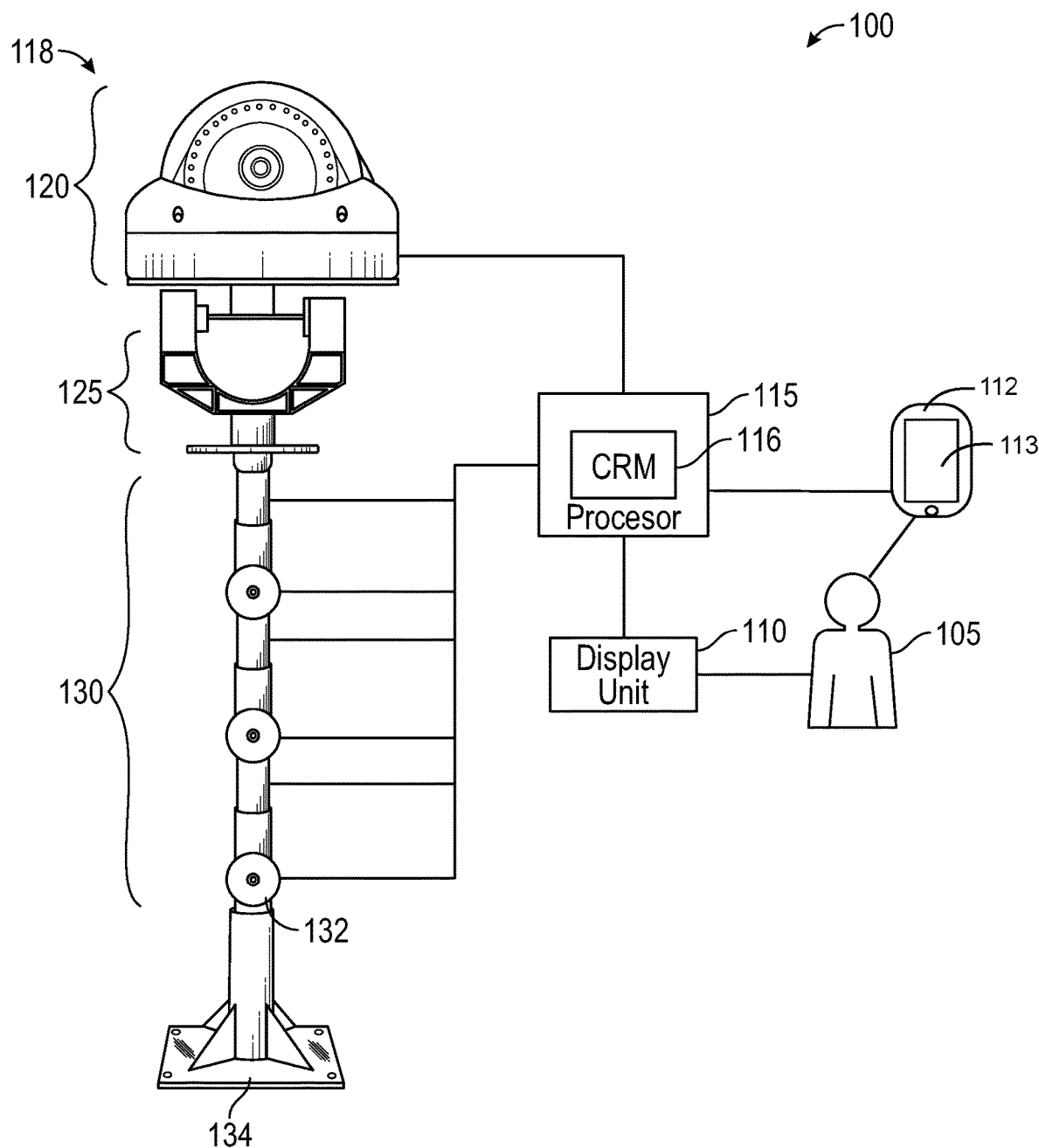
FIG. 4 shows a system embodying features consistent with the principles of the present disclosure.

Turning now to the drawings, FIGS. 1-5 illustrate preferred embodiments of a system 100, or certain components thereof, for displaying elevated, polarized views of water bodies. The system 100 is generally designed to obtain images from a vantage point located at a first location and subsequently transmit and display the same to a user 105 located at a second position. To this end, the system 100 of the present disclosure may comprise a camera 120, a mounting device 118, a display 110, a non-transitory computer-readable medium 116, and a processor 115 operably connected to the camera 120 and the display 110, as shown in FIGS. 1, 2, and 4. Although represented as a single mounting device 118, camera 120, non-transitory computer-readable medium 116, processor 115, and display 110, it is understood that the system may comprise of a plurality of cameras 120, mounting devices 118, displays 110, non-transitory computer-readable mediums 116, and processors 115 operably connected to the cameras 120 and the display 110.

The camera 120 is configured to capture video images of the environment in which the camera 120 is disposed and transmit the same as a video feed to the processor 115 which processes and subsequently transmits the video feed to the display 110 in real time. The camera 120 may be secured to a mounting device 118 to facilitate securement of the camera 120 in a fixed position. The camera 120 may have a filter 120B designed to filter out polarized light before reaching the lens 120A of the camera 120. Accordingly, by mounting the camera 120 to a first location at an elevated position above the boat's deck and mounting the display 110 in a second, non-elevated location on the boat, anglers may obtain elevated, non-polarized views of a body of water surrounding the boat without requiring the angler to occupy a fishing tower. Thus, in this way, the system 100 of the present disclosure may enable anglers to effectively sight fish in a safer manner than what is currently practiced within the art.

As provided above, the camera 120 is configured to capture video images of the environment in which the camera 120 is disposed and transmit the same as a video feed. As best shown in FIG. 2, the camera 120 may comprise a lens 120A, a filter 120B, a lens encasing 120C, a housing 120D, a camera processor encasing 120E, and a camera processor 120F. The camera processor 120F may be configured to perform the operations disclosed herein based on programming instructions stored within a non-transitory computer-readable medium coupled to the camera processor 120F. The camera processor 120F may be any processor or microprocessor suitable for executing such program instructions.

As shown best in FIG. 2, the camera processor encasing 120E is preferably made of a durable waterproof or water-resistant material such as plastic, though one of skill in the art will readily appreciate that other suitable waterproof or water-resistant materials may be used without departing from the inventive subject matter disclosed herein. The camera processor encasing 120E of FIG. 2 may have a top and a bottom. The lens 120A and lens encasing 120C preferably connects to the top of the camera processor encasing 120E in a way that allows the lens 120A and/or lens encasing 120C to rotate in the various manners disclosed herein. The top of the camera processor encasing 120E is preferably designed to secure to the housing 120D such that an airtight seal is established. The bottom of the camera processor encasing 120E is preferably designed to interlock or otherwise secure to a camera mount 125. In a preferred embodiment, the camera mount 125 may comprise a gimbal. As depicted in FIG. 2, the camera processor encasing 125E may retain the shape of a rectangular cube, but it is understood that the camera processor encasing 125E may be shaped in any manner suitable for encasing the camera processor 120F.

Preferably, the housing 120D is made of a durable waterproof or water-resistant material such as a plastic, as best shown in FIG. 2, though other materials suitable for constructing a waterproof housing may be used. To permit the camera 120 to capture clear video of the environment in which it is disposed, the housing 120D is preferably transparent. The housing 120D is shaped and sized to fit around the lens 120A, lens encasing 120C, and filter 120B. The bottom of the housing 120D is preferably configured to secure to the camera processor encasing 120E in order to establish an airtight seal. The housing 120D may be dome-shaped, as shown in FIG. 2. However, one of skill in the art will readily recognize that the housing 120D may retain any shape suitable for encapsulating the camera 120 in the manner disclosed herein.

The lens 120A and/or lens encasing 120C may be configured to rotate about an x-axis, y-axis, and/or z-axis. In preferred embodiment, the lens 120A and/or lens encasing 120C may rotate in the foregoing manner in response to user 105 interaction with the display 110, as disclosed herein, thereby enabling users 105 to remotely control the camera 120 and views provided by thereby. The lens 120A and lens encasing 120C are preferably constructed so that at least one filter 120B may be attached thereto. The filter 120B is preferably configured to filter out polarized light before it reaches the lens 120A. The filter 120B may be configured to be manually attached to the camera 120 such that the filter 120B covers the lens 120A. Alternatively, the filter 120B may be secured to the camera 120 such that users 105 may transition the filter 120B from a configuration that covers the lens 120A to a configuration that does not cover the lens 120A by interacting with the display 110 in the manner disclosed herein.

The processor 115 is configured to perform the operations disclosed herein based on programming instructions stored within the system 100. The processor 115 may be any processor suitable for carrying out such programming instructions. The processor 115 may be a component of a larger computing device. Computing devices 112 that may function as the processor 115 may include, but are not limited to laptops, desktops, cellular telephones, tablet computers, or any other similar device. Accordingly, the inventive subject matter disclosed herein, in full or in part, may be implemented or utilized in devices including, but not limited to, laptops, desktops, cellular telephones, tablet computers, or any other similar device.

In a preferred embodiment, the programming instructions responsible for the operations carried out by the processor 115 are stored on a non-transitory computer-readable medium 116 that is coupled to the processor 115, as shown in FIGS. 1, 2, and 4. In some instances, the programming instructions responsible for the operations carried out by the camera processor 120F may be stored within the non-transitory computer readable medium 116 coupled to the processor 115, as shown best in FIG. 2. Examples of non-transitory computer-readable mediums 116 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 116.

The system 100 of the present disclosure is configured such that the camera 120 may be secured in a fixed position to the surface of a boat or an object of the present on the boat. Surfaces and objects of the boat that a camera 120 may be secured to includes the roof, the deck, a fishing tower, a cross bar, or a fishing rod holder. However, one of skill in the art will readily appreciate that the camera 120 may be secured to alternative surfaces and objects without departing from the inventive subject matter disclosed herein. To facilitate mounting of the camera 120 in a fixed position at a desired location, the camera 120 is preferably secured to a mounting device 118. The mounting device 118 of the preferred embodiment comprises an adjustable arm 130 and a camera mount 125.

Figure 5:
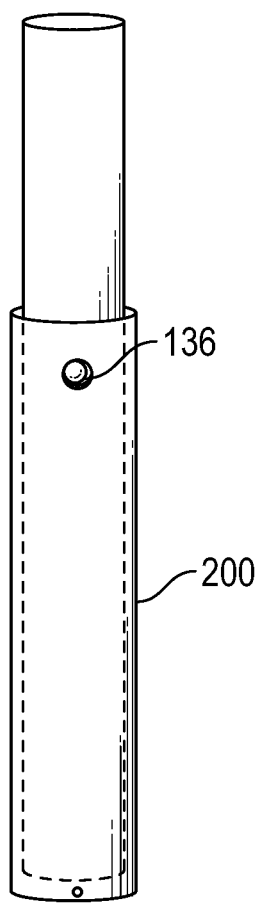
FIG. 5 shows an adjustable arm embodying features consistent with the principles of the present disclosure.

The adjustable arm 130 allows a user 105 to adjust the height at which the camera 120 is set. The adjustable arms 130 of FIGS. 1-5 have a first and second end. A camera 120 may be attached to the first end of the adjustable arm 130 through use of an attachment device such as a nut or bolt. To adjust the height exhibited by the adjustable arm 130, the adjustable arm 130 is preferably configured to extend in length. In one such embodiment, the adjustable arm 130 may be partially or fully telescopic. The adjustable arm 130 may be designed such that users 105 may extend the length of the adjustable arm 130, thereby effectively adjusting the extent to which the camera 120 is elevated, manually via physical interaction therewith or automatically via user 105 interaction with the display 110. In a preferred embodiment, automatic adjustment may be achieved with the assistance of an engine/motor operably connected to the adjustable arm. The adjustable arm may then be locked into place manually or automatically via a locking mechanism 136 or by the engine as shown in FIG. 5. As shown in FIG. 3, the second end of the adjustable arm 130 may be shaped and sized to fit into standard rod holders 200 commonly utilized on fishing boats to hold fishing rods in a fixed position. In this way, a camera 120 attached to the first end of an adjustable rod 130 may be set in a fixed position on a boat.

As shown in FIGS. 2, 3, and 5, the mounting device 118 may have one or more lockable joints 132 disposed between the adjustable arm's 130 first and second end that enable the adjustable arm 130 to assume different angular configurations, as shown best in FIG. 2. The adjustable arm 130 may be designed such that the lockable joints 132 may be adjusted manually via user 105 interaction therewith. Alternatively, the adjustable arm 130 may be designed such that the lockable joints 132 may be manipulated automatically via a motor/engine, which may receive commands after user 105 interaction with the display 110. This may allow remote manipulation and adjustment of the adjustable arm 130. To provide for automatic adjustment or extension for the adjustable arm 130 in the manner disclosed herein, the adjustable arm 130 may be operably connected to the processor 115 via a wireless, such as Bluetooth, or wired connection. The mounting device 118 may have a plurality of lockable joints 132 disposed between the first and second ends of the adjustable arms 130, as shown in FIG. 4.

The motor/engine is preferably one of a pneumatic engine, hydraulic engine, or electric motor. The pneumatic/hydraulic motor may comprise a pump, fluid, reservoir, control valves, a user control, an actuator connected to the pump via a plurality of tubes, and a plurality of seals. The pump supplies the fluid to the various components of the hydraulic/pneumatic motor. The control valves direct the fluid to various locations of the hydraulic/pneumatic motor via the plurality of tubes. In a preferred embodiment, a computing device 112 is operably connected to the control valves in a way such that a user may operate the computing device 112 so that it instructs the control valve which route through the plurality of tubes the fluid may take to the actuator. The actuator is responsible for moving objects using the work force generated by the pressure changes caused by the fluid. The reservoir holds fluid, which may be a liquid or gas, not currently being used to operate the hydraulic/pneumatic motor. The plurality of seals prevents the escape of fluid from the hydraulic/pneumatic motor.

In a preferred embodiment, the actuator further comprises a hydraulic/pneumatic cylinder defined by an internal cavity, a slidably moveable piston disposed within the internal cavity, and a strut operably connected to the slidably moveable piston. The slidably moveable piston may be shaped in a way such that it creates two chambers within the cavity. In a preferred embodiment, the hydraulic/pneumatic cylinder may be operably connected to the actuator in a way such that the computing device 112 manipulates the control valve so that it directs fluid pumped by the pump into one of a first chamber or a second chamber of the hydraulic/pneumatic cylinder. Pressure change resulting from fluid being injected into the first chamber or second chamber acts on the slidably moveable piston, causing the slidably moveable piston to move in a direction from higher pressure to lower pressure. The strut is projected out the strut end of the hydraulic/pneumatic motor and is coupled to the adjustable arms 130 of the mounting device 118. Operating the hydraulic/pneumatic motor to cause the slidably moveable piston to move in a direction from higher pressure to lower pressure causes the strut to move in a linear direction, which in turn causes the adjustable arms 130 to change positions. For instance, a hydraulic/pneumatic motor may be attached to the adjustable arms 130 in a way such that a user 105 may change the height of the camera 120 attached thereto by manipulating a user interface 113 of a computing device 112 operably connected to said hydraulic/pneumatic motor via a processor.

In another preferred embodiment, the electric motor comprises an armature, stator, gear train, and drum. The armature may be defined as rotor having a magnetic field that may be used to generate torque, and the stator may be defined as an outer set of permanent magnets or field coils that interact with the magnetic field of the armature to generate torque. By altering the magnetic field of the stator, the armature rotates in a way that produces the aforementioned torque. At least one chain is preferably attached to a gear of the engine and a gear of the adjustable arm 130. The motor may turn the gear about a central axis, which may cause the chain to turn the gear of the adjustable arm 130. In a preferred embodiment, the adjustable arms 130 may be attached to the gears in a way such that rotating them may change the position of the adjustable arm 130. In a preferred embodiment, the position may be changed from a lowered position to a raised position, or vice versa.

In another preferred embodiment, the gear train may comprise a worm gearbox having a worm shaft, worm gear, and worm gear shaft. The worm shaft comprises threads that engage the worm gear in a way such that when the worm shaft is rotated, the worm gear rotates perpendicular relative to the worm shaft. The worm gear shaft is connected to the worm gear so that it rotates as the worm gear rotates. In a preferred embodiment, the worm shaft is operably connected to the motor in a way such that it may turn the worm shaft about said central axis, which in turn causes the worm gear shaft to rotate. This rotation may cause the work gear shaft to extend, thus extending the adjustable arm 130 to raised position. By reversing rotation of the engine, a user 105 may cause the adjustable arm 130 to lower, thus lowering the adjustable arm 130 to a lowered position.

A user interface 113 may be defined as a space where interactions between a user 105 and the system 100 may take place. In a preferred embodiment, the interactions may take place in a way such that a user 105 may control the operations of the system 100, and more specifically, allow a user 105 to control the position of the adjustable arms 130. A user 105 may input instructions to control operations of the system 100 manually using an input device. For instance, a user 105 may choose to alter the position of the control arms 130 by using an input device of the system 100, including, but not limited to, a keyboard, mouse, or touchscreen. A user interface 113 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 100 may present data of the user interface 113 to the user 105 via a display operably connected to the processor 115.

In an embodiment, the system 100 may determine the taxonomic rank of marine life while still in the water using a digital image captured by the camera 120. For instance, a user 105 participating in a deep-sea fishing charter trip may capture a digital image of marine life swimming in the ocean near the chartered vessel. The system 100 may automatically determine that the taxonomic rank of the marine life is a sailfish via digital signal processing and relay that data to the user 105. In an embodiment, the system 100 may use a machine learning technique to determine a taxonomic rank of marine life swimming in the water and captured within a digital image. For instance, pattern recognition or feature extraction may be used to determine that the taxonomic rank of marine life within a digital image is a bonefish. For instance, pattern recognition or feature extraction may be used to determine that the taxonomic rank of fauna within a digital image is an alligator. Pattern recognition methods may use labeled data that the system 100 may match to a digital image using algorithms to determine a taxonomic rank of marine life. Feature extraction methods may use algorithms to detect and isolate various desired portions or shapes of a digital image to determine a taxonomic rank of marine life. Alternatively, the system 100 may use more than one machine learning technique to determine a taxonomic rank of marine life from a digital image. For instance, if the system 100 fails to determine a taxonomic rank of marine life using pattern recognition, the system 100 may subsequently attempt to determine a taxonomic rank of marine life using feature extraction.

The system 100 may compare data from the captured digital image relating to the general shape of the marine life, the color of the marine life, and/or visible markings on the marine life, such as spots or stripes in various locations on the body of the marine life. When the taxonomic rank is detected by the system 100, the system 100 may automatically transmit the information to a display for the user 105. However, because some taxonomic ranks, particularly those of closely related species, may have a very similar physical appearance, the system 100 may provide the user 105 with a plurality of taxonomic rank options if a specific taxonomic rank cannot be determined from the digital image. In addition, the displayed taxonomic ranks may be limited based on geospatial data and/or data specifying a specific habitat range associated with identified taxonomic rank. However, a user 105 may override the provided taxonomic rank list to choose from any taxonomic rank contained within the database.

In addition, the system 100 may be programmed to calculate the travel vector needed to intercept the marine life based on the velocity vector of the marine life in a digital image as well as the velocity vector of the marine vehicle. A travel vector may be defined as the speed and direction needed to intercept marine life based on the speed and direction in which a species of marine life appears to be traveling within a series of captured digital images and the speed and direction in which the marine vehicle is traveling. For instance, the system 100 may determine the direction that the marine life appears to be traveling within the digital image and determine a speed in which the marine life appears to be traveling in said direction based on the analysis of a plurality of digital images taken in quick succession of one another. Using the marine vehicles speed and direction may then allow the system to determine the direction and speed in which the marine vehicle must travel to intercept the marine life.

In a preferred embodiment, the system 100 may determine the speed in which a marine life is traveling using a Euclidian distance analysis. During a Euclidian distance analysis, the system 100 may break the image data into a plurality of cells and determine the distance from a center of a source cell to the center of each of the surrounding cells. By calculating the hypotenuse to each source cell using x-max and y-max as the legs of the triangle, the system may derive the true Euclidean distance. If the calculated shortest distance to a source is less than the specified maximum distance, the value may be assigned to the cell location on the output raster. The output values for the output rasters are preferably floating-point distance values. If a surrounding cell is at an equal distance to two or more source cells, the surrounding cell may be assigned to the source cell that is first encountered in the scanning process. Once the distances are derived, the system 100 may determine the speed by dividing the distance traveled by the amount of time it took to travel that distance.

In another preferred embodiment, the camera 120 may comprise a depth sensor, which the system 100 may use to determine distance to marine life. The system 100 may determine the speed of the object by determining the change in distance over time from the camera 120 based on the distance determined within a plurality of consecutive images. In a preferred embodiment, the depth sensor is a stereo depth camera. Stereo depth cameras have two closely spaced sensors, which take two images that are then sent to the processor. Because the distance between the sensors is known, comparing the two images allows the processor to determine depth information, which the system 100 may then use to calculate a speed. Alternatively, the depth sensor may be a time-of-flight camera or a structured/coded light camera.

The system 100 may also determine the direction the marine life is traveling. In a preferred embodiment, the system 100 may determine a bearing of the marine life and a bearing of the marine vehicle. Once the speed and direction of marine life has been determined, the system 100 may calculate velocity vectors for the marine life and marine vehicle, respectively. By adding the velocity vectors, the system 100 may then determine a travel vector, which a user 105 may use to indirectly intercept the marine life. As the velocity and direction of the marine vehicle and marine life changes, so will the travel vector, thus allowing a user 105 to intercept the marine life. In some preferred embodiments, the system 100 may transmit the direction and speed of the marine life and/or the marine vehicle to the display. In other preferred embodiments, the system 100 may interpose speed data, direction data, velocity data, and/or travel vector data over the image data before transferring it to the display so that a user 105 may see the shortest distance to the marine life.

A camera mount 125 may be used to secure the camera 120 to the first end of the extendable arm 130. As disclosed above, in a preferred embodiment, the camera mount 125 may be a gimbal to reduce unwanted movement of the camera 120 when the system 100 is in use. FIGS. 1, 2, and 4 show a mounting device 118 comprising a camera mount 125 configured to interlock with or otherwise secure to the camera 120 disposed or secured to an adjustable arm's 130 first end. Alternatively, the camera mount 125 may be configured to mount to a surface or component of a boat, such as a boat's deck or fishing tower, in a way such that the camera 120 may be secured to a fixed position on the boat without the need of an adjustable arm 130.

FIGS. 2 and 4 depict a mounting device 118 further comprising a base plate 134. The base plate 134 allows a mounting device 118 to be secured in a fixed position to the surface or an object of a boat anywhere the base plate 134 is secured. As depicted in FIGS. 2 and 4, the base plate 134 is attached the second end of an adjustable arm 130. Alternatively, the base plate 134 may attach to a camera mount 125. The base plate 134 may comprise a flat and square shaped section in contact with a surface, though it is understood that the base plate 134 may be shaped and sized in alternative manners and still fall within the scope of the present disclosure. As shown in FIG. 2, the base plate 134 may have a plurality of openings therein through which screws, bolts, nails, or other suitable fastening instruments or devices may pass through to secure the baseplate to a desired surface or object present on a user's 105 boat. However, one of skill in the art will readily appreciate that the base plate 134 may be secured to a boat surface or object in alternative manners without departing from the inventive subject matter disclosed herein. For instance, the base plate 134 may be secured to a boat surface using adhesives.

As provided above, the display 110 is configured to receive video images of the environment from the camera 120 and display these images for user review. The video feed generated by the camera 120 may be directed to a processor 115 connected thereto before being displayed on the display 110 for user 105 review. The camera 120 and display 110 may be operably connected to the processor 115 via a wireless, such as Bluetooth, or wired connection. The display 110 may be any screen suitable for displaying a video feed from the camera 120. As such, a display 110 may be a mounted television, computer monitor, smartphone, tablet computer, VR goggles, or any other similar device.

In a preferred embodiment, the display 110 may be an interactive display such that users 105 may interact with the display 110 to manipulate the camera 120. For instance, the system 100 may be designed such that a user 105 may interact with the display 110 to rotate the camera 120 in a horizontal and/or vertical direction, adjust the elevation at which the camera 120 is disposed by manipulating the mounting device 118 in the manner described herein, switch between filtered and non-filtered views, or to control various other functions of the camera 120. To facilitate user interaction with the display 110, the display 110 may have one or more controllers operably connected thereto that users 105 may engage with to control the camera 120, as described herein. The one or more controllers may include, but is not limited to, keyboards, mouses, joysticks, haptic gloves, or combinations thereof. In some instances, the display 110 may include a touchscreen display.

User 105 interaction with the display 110 generates input data which may be transmitted to and subsequently processed by the processor 115. Upon processing the input data, the processor 115 may transmit a series instructions to the camera processor 120F, which, when read and executed thereby, causes the camera lens 120A and or the lens encasing 120C to be manipulated in the manner prescribed by the user 105 through the user's interaction with the display 110. Input data generated by user 105 interaction with the display 110 may be processed in a similar manner to manipulate the adjustable arm 130. Accordingly, in some embodiments, the adjustable arm 130 may be operably connected to the camera processor 120F. Alternatively, the adjustable arm 130 may further comprise an internal processor of its own configured to receive instructions from processor 115 and execute the same to manipulate or adjust the adjustable arm 130 in the manner prescribed by a user 105.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system for displaying views of water bodies comprising,
    a base plate configured to attach to a marine vehicle,
    a mounting device having a motor and connected to said base plate,
    a camera connected to said mounting device,
        wherein said camera is configured to obtain image data,
        wherein an adjustable arm of said mounting device is secured to said base plate at a first end and a camera mount at a second end,
        wherein said adjustable arm is configured to alter a height of said camera via said motor,
    a display configured to receive said image data from said camera,
    a processor operably connected to said camera and said display, and
    a non-transitory computer-readable medium coupled to said processor,
        wherein said non-transitory computer-readable medium contains instructions stored thereon, which, when executed by said processor, cause said processor to perform operations comprising:
            obtaining image data from said camera, and
            transmitting said image data to said display.

2. The system of claim 1, wherein said mounting device further comprises an adjustable arm, wherein said adjustable arm is connected to said base plate, wherein said adjustable arm alters a height of said camera wherein said non-transitory computer-readable medium contains additional instructions, which, when executed by said processor, cause said processor to perform additional operations comprising:
    analyzing said image data for a velocity vector of marine life captured within said image data,
    creating a travel vector using said velocity vector of said marine life,
        wherein said travel vector represents a speed and direction needed to intercept marine life, and
    transmitting said travel vector to said display.

3. The system of claim 1, wherein said adjustable arm further comprises at least one lockable joint.

4. The system of claim 3, wherein said at least one lockable joint is locked into a position via a locking element.

5. The system of claim 4, wherein said at least one lockable joint is automatically locked into said position via said locking element.

6. The system of claim 1, wherein said motor is at least one of a pneumatic engine, hydraulic engine, and electric motor.

7. The system of claim 6, wherein said adjustable arm is locked in place by at least one of said pneumatic engine, hydraulic engine, and electric motor.

8. The system of claim 6, wherein said electric motor turns gears of at least one lockable joint of said adjustable arm in a way such that said adjustable arm is raised and lowered based on a direction in which said electric motor turns said gears.

9. A system for displaying views of water bodies comprising,
    a camera configured to obtain image data of marine life that is swimming within a body of water,
        wherein a lens of said camera is configured to rotate about at least one of an x-axis, y-axis, and z-axis,
    an adjustable arm having a motor and attached to said camera,
        wherein said adjustable arm is configured to alters a height of said camera via said motor, a display configured to receive image data,
a processor operably connected to said camera and said display, and
a non-transitory computer-readable medium coupled to said processor,
wherein said non-transitory computer-readable medium contains instructions stored thereon, which, when executed by said processor, cause said processor to perform operations comprising:
obtaining image data from said camera, and
transmitting said image data to said display.

10. The system of claim 9, wherein said adjustable arm further comprises at least one lockable joint.

11. The system of claim 10, wherein said at least one lockable joint is locked into a position via a locking element.

12. The system of claim 11, wherein said at least one lockable joint is automatically locked into said position via said locking element.

13. The system of claim 9, wherein said non-transitory computer-readable medium contains additional instructions, which, when executed by said processor, cause said processor to perform additional operations comprising:
analyzing said image data for a velocity vector of said marine life,
creating a travel vector using said velocity vector of said marine life,
wherein said travel vector represents a speed and direction needed to intercept marine life, and
transmitting said travel vector to said display.

14. The system of claim 9, wherein said motor is at least one of a pneumatic engine, hydraulic engine, and electric motor, wherein said adjustable arm is locked in place by at least one of said pneumatic engine, hydraulic engine, and electric motor.

15. The system of claim 9, wherein said motor is an electric motor, wherein said electric motor turns gears of at least one lockable joint of said adjustable arm in a way such that said adjustable arm is raised and lowered based on a direction in which said electric motor turns said gears.

16. A system for displaying views of water bodies comprising,
a camera configured to obtain image data,
an adjustable arm having a motor,
wherein said adjustable arm is attached to said camera,
wherein said motor alters a position of said adjustable arm,
wherein said adjustable arm alters a height of said camera based on said position,
a display configured to receive image data,
a processor operably connected to said camera, adjustable arm, and said display, and
a non-transitory computer-readable medium coupled to said processor,
wherein said non-transitory computer-readable medium contains instructions stored thereon, which, when executed by said processor, cause said processor to perform operations comprising:
obtaining image data from said camera,
displaying said image data via said display,
receiving commands from a computing device having a user interface,
wherein a user inputs said commands into said user interface to manipulate said position of said adjustable arm, and
altering said position of said adjustable arm based on said commands.

17. The system of claim 16, wherein said non-transitory computer-readable medium contains additional instructions, which, when executed by said processor, cause said processor to perform additional operations comprising:
analyzing said image data for a velocity vector of marine life captured within said image data,
creating a travel vector using said velocity vector of said marine life,
wherein said travel vector represents a speed and direction needed to intercept marine life, and
transmitting said travel vector to said display.

18. The system of claim 16, wherein said motor is at least one of a pneumatic engine, hydraulic engine, and electric motor, wherein said adjustable arm is locked in place by at least one of said pneumatic engine, hydraulic engine, and electric motor.

19. The system of claim 16, wherein said adjustable arm further comprises at least one lockable joint.

20. The system of claim 16, wherein said motor is an electric motor, wherein said electric motor turns gears of at least one lockable joint of said adjustable arm in a way such that said adjustable arm is raised and lowered based on a direction in which said electric motor turns said gears.

21. A system for displaying views of water bodies comprising,
a camera configured to obtain image data,
wherein a lens of said camera is configured to rotate about at least one of an x-axis, y-axis, and z-axis,
a mounting device having a motor and connected to said camera,
wherein said mounting device alters a height of said camera via an adjustable arm of said mounting device,
wherein said motor is configured to manipulate a position of said adjustable arm,
wherein manipulation of said position of said adjustable arm causes said height of said camera to be altered,
a display configured to receive said image data,
a processor operably connected to said camera and said mounting device, and
a non-transitory computer-readable medium coupled to said processor,
wherein said non-transitory computer-readable medium contains instructions stored thereon, which, when executed by said processor, cause said processor to perform operations comprising:
obtaining image data from said camera,
displaying said image data on said display,
receiving commands from a computing device having a user interface,
wherein said commands cause said lens of said camera to rotate about at least one of said x-axis, y-axis, and z-axis, and
rotating said lens of said camera based on said commands.

22. The system of claim 21, wherein said non-transitory computer-readable medium contains additional instructions, which, when executed by said processor, cause said processor to perform additional operations comprising:
analyzing said image data for a velocity vector of marine life captured within said image data,
creating a travel vector using said velocity vector of said marine life,
wherein said travel vector represents a speed and direction needed to intercept marine life, and
transmitting said travel vector to said display.

23. The system of claim 21, wherein said adjustable arm further comprises at least one lockable joint.

24. The system of claim 23, wherein said at least one lockable joint is locked into a position using a locking element.

25. The system of claim 21, further comprising a base plate configured to attach to a marine vehicle, wherein said mounting device is secured at a first end to base plate and secured at a second end to said camera.

26. The system of claim 21, wherein said motor is at least one of a pneumatic engine, hydraulic engine, and electric engine.

27. The system of claim 26, wherein said adjustable arm is locked in place by at least one of said pneumatic engine, hydraulic engine, and electric motor.

28. The system of claim 21, wherein said motor is an electric motor, wherein said electric motor turns gears of at least one lockable joint of said adjustable arm in a way such that said adjustable arm is raised and lowered based on a direction in which said electric motor turns said gears.

* * * * *